United States Patent [19]
Choate

[11] 3,840,883
[45] Oct. 8, 1974

[54] CAMERA LENS HOOD
[76] Inventor: J. Robert Choate, Sampson Rd., Rochester, N.H. 03867
[22] Filed: Sept. 17, 1973
[21] Appl. No.: 397,777

[52] U.S. Cl.............. 354/202, 354/287, 350/58, 350/65
[51] Int. Cl. .......................................... G03b 11/04
[58] Field of Search .................. 95/11; 350/58, 65; 354/202, 287

[56] References Cited
UNITED STATES PATENTS
1,775,180  9/1930  Worsching ........................ 350/58
2,725,804  12/1955  Herzfeld ............................ 95/18
3,746,423  7/1973  Mills .................................. 350/65

Primary Examiner—John M. Horan
Attorney, Agent, or Firm—Strauch, Nolan, Neale, Nies & Kurz

[57] ABSTRACT

A hood and cover for a camera lens to provide full protection for the lens and lens mount system while permitting instant use of the camera, the hood also providing a variably positionable sun shade.

8 Claims, 3 Drawing Figures

PATENTED OCT 8 1974  3,840,883

CAMERA LENS HOOD

BACKGROUND OF THE INVENTION

Most cameras, particularly 35 mm cameras, now in widespread use, incorporate a complex lens system, the outermost component of which is carried by a short shroud which is usually threaded to accommodate additional lenses or attachments.

While the basic camera structure is relatively rugged, the lens and lens mount are quite susceptible to mechanical damage and must be protected against dirt and moisture. If the front lens element is unprotected it is subject to moisture, dust, smog, and physical damage and must be constantly cleaned, which degrades the soft coating and denigrates the performance of the lens system.

Accordingly, most such cameras are kept in carrying cases which enclose the entire camera. While such cases provide the necessary protection, they are relatively awkward to open and close with the result that either the camera is not ready for use or, if the case is left open, the lens if left unprotected.

Also, the case usually fits only over the normal lens, which makes the case useless for wideangle or telephoto lenses when such are mounted to the camera.

Lens covers can be used for protection, but must be unscrewed before the camera can be used, and once removed, are readily lost. Filters, usually clear or UV, are also used, but degrade the lens performance as well as getting dusty, dirty, wet, etc. Both of the above are considerably less than ideal, and neither offers any shock protection to the lens elements and mount.

Other types of lens covers and hoods previously proposed as disclosed, for example, in U.S. Pat. Nos. 1,283,963; 1,775,180 and 2,488,188, suffer from one or more of the above stated disadvantages, in that they are awkward to manipulate or fail to provide the necessary total protection to the lens system.

SUMMARY OF THE DISCLOSURE

It is the principal purpose and object of the present invention to provide improved camera lens hoods which overcome the disadvantages of camera cases and prior lens covers and which provide maximum protection for the lens and lens mount system and yet permit immediate access to the lens.

It is further an object of the present invention to provide improved camera lens hoods which enhance rather than denigrate the performance of the camera.

It is also an object of the present invention to provide improved lens hoods which are adaptable for use with a variety of cameras, which are relatively simple and inexpensive to manufacture and which are durable and trouble free.

In attaining these and related objects the present invention provides a lens hood including a mounting member adapted to be threaded on the camera structure, a frusto-conical resilient hood member carried by the mounting member for rotation about the axis of the camera lens and a cover pivotally mounted on the outer end of the hood. The cover is movable through a series of intermediate positions between limit positions in one of which the lens is wholly unobstructed and the other limit position the lens is completely covered and sealed against dirt and moisture and protected against mechanical damage.

Additional objects and advantages of the present invention will become apparent as the description proceeds.

THE DRAWINGS

FIG. 1 is a side elevation, partly in section, illustrating the lens hood of the present invention installed on a camera, the full line position of the parts illustrating the lens hood completely closed and the dotted line position showing the hood in its full open position; and FIGS. 2 and 3 are front elevations showing the hood in full open and full closed positions, respectively.

DESCRIPTION OF PREFERRED EMBODIMENT

Figure 1:
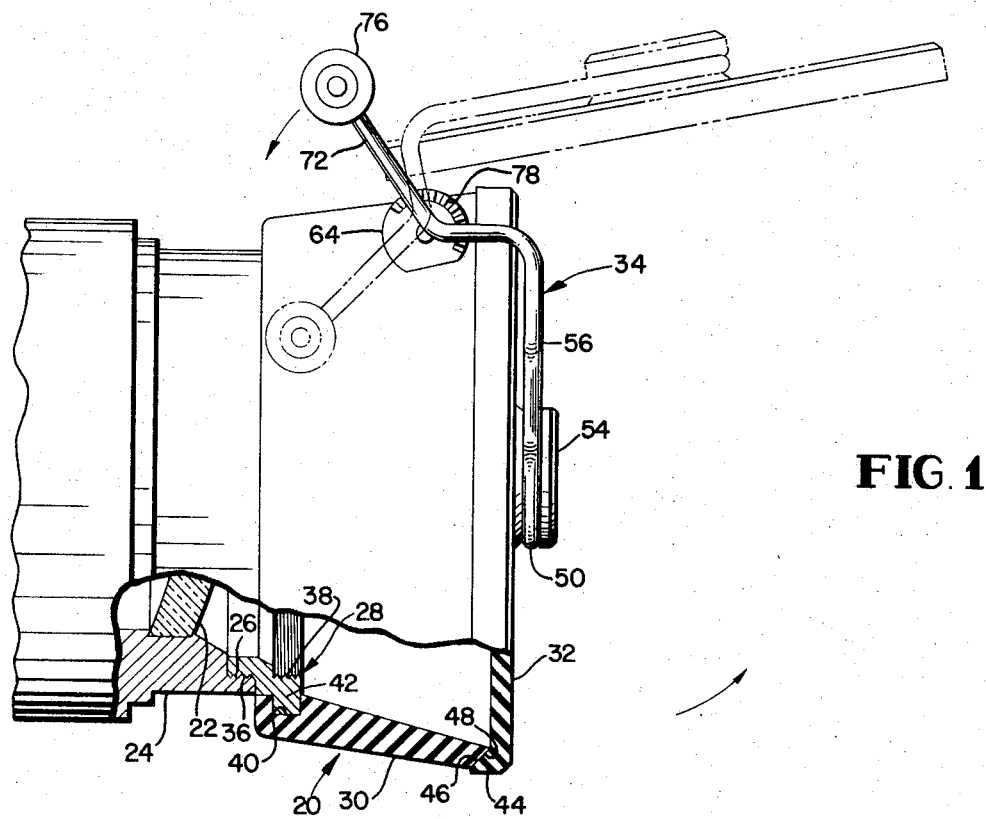

The lens hood and cover of the present invention, indicated generally at 20, is shown in association with a conventional 35 mm camera having the usual front lens element 22, carried by a mounting assembly 24. Conventionally, the outer end of the lens mount unit 24 is threaded as at 26 to permit the attachment of filters, additional lens systems and the like.

The principal components of the hood assembly 20 are adaptor ring 28, a hood member 30, a cover member 32 and a retainer-operator 34. The adaptor ring 28, which is preferably fabricated from black annodized aluminum which is corrosion resistant and non-reflective, is provided with male threads 36 adapted to fit the standard lens threads 26. The adapter ring may be provided with a second set of female threads 38 identical to the lens threads 26 so that filters and other devices which normally attach to the lens may be used as required.

The hood member 30, which is of generally frusto-conical configuration, is fabricated from a dull non-reflective black elastomeric material, as rubber or polyurethane, of a durometer range typically from 80 to 95.

The inside of the conical hood may be serrated or otherwise molded to mechanically prevent reflectance back towards the lens. If it is difficult to provide the proper dull finish on the elastomeric material used, such annular serrations may be incorporated into the mold to minimize the necessity for close control of the elastomer.

The hood member has sufficient outward flare so as not to interfere with the normal field of the lens system. At its inner end the hood member 30 has an annular groove 40 which snaps over an annular flange 42 on the adapter ring. The parts are so dimensioned that the hood 30 is received on the adapter ring with a light friction fit which is sufficiently tight to prevent accidental dislodgement of the hood and yet permits rotation of the hood and retention of the hood in any rotated position.

The cover 32, which is also of black 80 durometer rubber is essentially flat and has a marginal inturned flange 44 having an internal tapered seat 46 sealingly engageable with a tapered external seat 48 on the hood member 30.

Figures 2, 3:
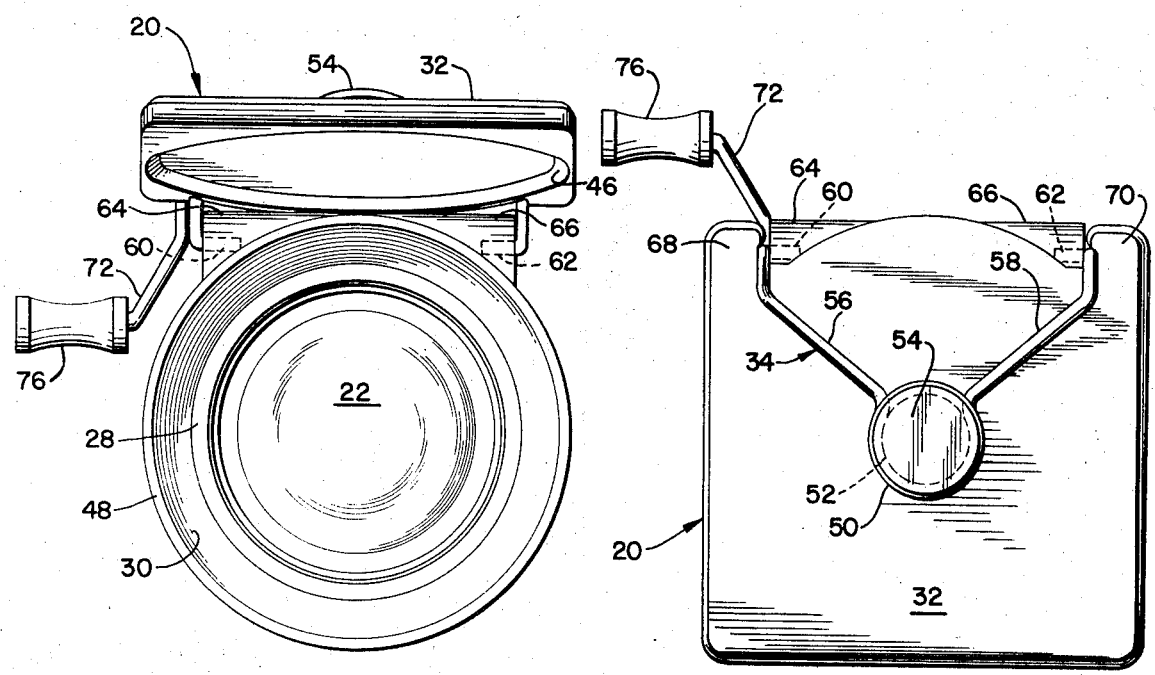

The cover 32 is pivotally supported on the hood 30 by the wire frame assembly 34 which is formed from black annodized stainless steel. As best shown in FIG. 3 the central position 50 of the wire frame 34 fits snugly around a groove 52 in a boss 54 projecting from the forward face of the cover 30. The upwardly and outwardly projecting spring arms 56 and 58 of the wire frame terminate in inwardly directed fingers 60 and 62 received with a light friction fit in aligned openings 60 and 62 provided in bosses 64 and 66 formed integrally with the hood member 30.

Extensions 68 and 70 on the cover 32 trap the spring arms 56 and 58 to prevent accidental dislodgement of the fingers 60 and 62 from the hood member 30. An operating arm 72 is suitably secured to the wire frame 34 and is provided with a knob 76 to facilitate manipulation of the cover 32. A portion of the arm 72 is held in tight frictional engagement with a series of detents 78 to assure that the cover will be maintained in fully closed position, fully opened position, or any desired intermediate position.

After the hood assembly has been assembled it may be installed on the camera by simply screwing it in place. When the unit is closed, as shown in FIGS. 1 and 3, it is firmly held in this position by the detents 78. Closing force is applied centrally of the cover 32, thus assuring a tight uniform peripheral seal. Since the peripheral edge of the cover 32 extends outwardly around the adjacent end of the hood 30, accidental impact on the cover 32 tends to tighten the peripheral seal rather than dislodge or distort the elements and contributes substantially to the overall strength of the assembly.

When it is desired to use the camera under normal lighting conditions it is necessary simply to flip the cover to the full open position shown in FIGS. 1 and 2. Since the pivot axis of the cover is offset from the front edge of the hood, the cover is displaced rearwardly as well as outwardly so as to be completely out of the field of the lens. Under unusual lighting conditions, the cover 32 may be moved to any intermediate position to provide additional shading of the lens as desired. Since the hood 30 is rotatable on the adapter 28, the extended cover 32 may be moved to any position to achieve optimum setting for a given light situation. When the cover 32 is closed the lens is completely protected against moisture and dirt. The flexibility of the cover 32 and the hood member 30 also effectively provides a shock absorbing unit which protects the front lens element as well as the very precisely machined and delicate lens mount from physical impact.

Thus the foregoing objects of the present invention have been attained by the provision of a novel lens hood and cover which provides protection against impact damage, which provides a precision seal to project the lens from contamination by moisture, dust and dirt, and which is instantly openable to provide immediate use of the camera, and provides a fully adjustable and completely variable sunshade.

I claim:

1. A shock resistant lens hood and cover for a camera having a shroud surrounding a lens comprising a rigid mounting member adapted for attachment to said shroud, a flexible hood carried by said mounting member for rotation about the axis of said lens, a flexible cover, a frame assembly, cooperating means on said frame assembly and said cover for securing said frame assembly to the central portion of said cover, means mounting said frame assembly on said hood for pivotal movement about an axis displaced a substantial distance rearwardly of the outer end of said hood whereby said cover may be moved between a closed position in which said cover sealingly engages the end of said hood remote from said member and an open position in which said cover is out of the field of said lens and upon movement of said cover to said open position said cover is displaced outwardly and rearwardly of said hood, and cooperating means on said frame and said hood for retaining said cover in a selected open position or in closed position, said frame assembly applying closing pressure to the cover centrally thereof to assure a tight peripheral seal.

2. The combination according to claim 1 wherein said mounting member has an outwardly projecting peripheral flange and said hood has a peripheral groove fitting over said flange with a light friction fit to retain said hood against axial displacement and yet permit free rotation of said hood on said mounting member.

3. The combination according to claim 1 wherein said hood and said cover have outwardly and inwardly facing tapered sealing surfaces, respectively, adapted to be sealingly engaged when said cover is moved to said closed position.

4. The combination according to claim 1, wherein the mounting means for said frame comprises a pair of aligned inturned fingers on said frame assembly rotatably received in bosses on said hood.

5. The combination according to claim 1, wherein the last-mentioned means comprises detents formed on said cover engagable by a portion of said frame assembly.

6. The combination according to claim 1, together with an operating arm carried by same frame assembly and extending rearwardly toward said camera to facilitate displacement of said cover between open and closed positions.

7. The combination according to claim 1, wherein said cover is of essentially square configuration and on its inner surface is provided with a circular recess surrounded by a peripheral sealing lip.

8. A shock resistant lens hood and cover for camera having a shroud surrounding a lens comprising, a rigid mounting member adapted for attachment to said shroud, a flexible hood carried by said mounting member for rotation about the axis of said lens, said hood terminating at its outer end in an outwardly facing tapered sealing surface, a flexible cover having a recessed central portion surrounded by a peripheral lip having an inwardly facing tapered sealing surface adapted to sealingly engage the sealing surface on said hood, means forming a boss on the outer surface of said cover centrally thereof, a spring frame assembly having a portion adapted to frictionally engage said boss and having a pair of spring arms extending toward the marginal edges of said cover, said spring arms terminating in aligned inturned fingers rotatably received in bosses on said housing, means on said hood for retaining said spring frame in any position to which it is moved, whereby said spring frame assembly pivotally supports said cover on said hood for movement between a closed position in which spring frame urges said cover into sealing engagement with the end of said hood remote from said member and an open position in which said cover is out of the field of said lens, and means on said cover for preventing outward spreading movement of said spring arms to retain said spring frame assembly in engagement with the boss on said cover and to maintain said inturned fingers in said bosses on said housing.

* * * * *